United States Patent
Shigezumi et al.

(10) Patent No.: US 9,581,454 B2
(45) Date of Patent: Feb. 28, 2017

(54) ROUTE INFORMATION PROCESSING APPARATUS AND ROUTE INFORMATION PROCESSING METHOD

(71) Applicant: FUJITSU LIMITED, Kawasaki-shi, Kanagawa (JP)

(72) Inventors: Junichi Shigezumi, Kawasaki (JP); Tatsuya Asai, Kawasaki (JP); Hiroaki Morikawa, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/866,093

(22) Filed: Sep. 25, 2015

(65) Prior Publication Data

US 2016/0161272 A1    Jun. 9, 2016

(30) Foreign Application Priority Data

Dec. 4, 2014   (JP) ................................ 2014-246250

(51) Int. Cl.
   *G01C 21/34*   (2006.01)
(52) U.S. Cl.
   CPC .................... *G01C 21/34* (2013.01)
(58) Field of Classification Search
   CPC combination set(s) only.
   See application file for complete search history.

(56) References Cited

U.S. PATENT DOCUMENTS 6,195,022 B1    2/2001 Yamakita
8,918,282 B1 *  12/2014 Stenneth ............. G08G 1/0112
                                              701/117

FOREIGN PATENT DOCUMENTS

JP    10-111877     4/1998
JP    2004-325083   11/2004

OTHER PUBLICATIONS

Helmut Alt et al.; "Matching planar maps", Journal of Algorithms 49 (2003), pp. 262-283 (22 pages), January.

* cited by examiner

*Primary Examiner* — Thomas Tarcza
*Assistant Examiner* — Edward J Pipala
(74) *Attorney, Agent, or Firm* — Fujitsu Patent Center

(57) ABSTRACT

A route information processing apparatus includes: a processor configured to execute a program; and a memory configured to store the program, wherein, based on the program, the processor performs operations to: calculate maximum values corresponding to a Frechet distance between one line segment of one or more line segments between observation points included in a trajectory and each of sets of two nodes corresponding to the one line segment, the nodes being included in a route graph including linked paths which link nodes; and acquire a path corresponding to the trajectory having a smallest value among the maximum values of the one or more line segments.

14 Claims, 41 Drawing Sheets

FIG. 2

| TRAJECTORY ID | OBSERVATION POINT ID | X COORDINATE | Y COORDINATE |
|---|---|---|---|
| α1 | 1 | 0 | 30 |
| α1 | 2 | 100 | 30 |
| ... | ... | ... | ... |
| α2 | 1 | 10 | 50 |
| ... | ... | ... | ... |

FIG. 3

| NODE | | | LINK |
|---|---|---|---|
| NODE ID | X COORDINATE | Y COORDINATE | |
| A | 0 | 60 | A_B<br>B_C<br>C_D<br>D_E<br>E_F |
| B | 80 | 60 | |
| C | 40 | 40 | |
| D | 60 | 10 | |
| E | 20 | 0 | |
| F | 100 | 0 | |

FIG. 6A
FIG. 6B
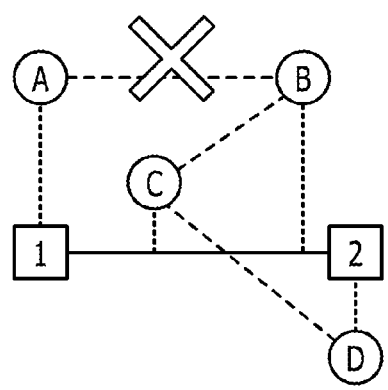
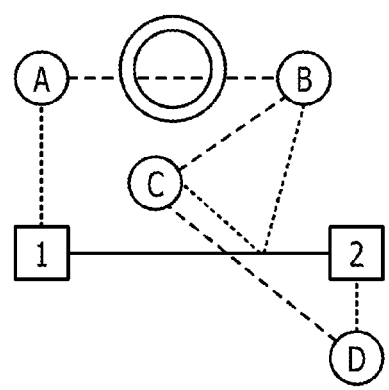

FIG. 8

$\langle \varepsilon_{x,y} \rangle$

| X \ Y | A | B | C | D | E | F |
|---|---|---|---|---|---|---|
| A | 30.0 | 30.0 | 30.0 | 30.0 | 30.0 | 30.0 |
| B |  | 30.0 | 31.6 | 30.0 | 42.4 | 30.0 |
| C |  |  | 10.0 | 20.0 | 30.0 | 30.0 |
| D |  |  |  | 20.0 | 33.0 | 30.0 |
| E |  |  |  |  | 30.0 | 30.0 |
| F |  |  |  |  |  | 30.0 |

| NODE | | |
|---|---|---|
| NODE ID | X COORDINATE | Y COORDINATE |
| A | 10 | 80 |
| B | 110 | 80 |
| C | 10 | 70 |
| D | 90 | 70 |
| E | 50 | 50 |
| F | 70 | 20 |
| G | 30 | 10 |
| H | 110 | 10 |
| I | 10 | 0 |
| J | 110 | 0 |

LINK

A_B
A_C
B_H
C_D
C_I
D_E
E_F
F_G
G_H
H_J
I_J

| OBSERVATION POINT ID | X COORDINATE | Y COORDINATE |
|---|---|---|
| 1 | 0 | 80 |
| 2 | 0 | 40 |
| 3 | 100 | 40 |
| 4 | 100 | 0 |

Ⓐ-----Ⓑ  ROUTE GRAPH

①——②  TRAJECTORY

IN THE CASE OF V = V' = A AND j = 1

<PROCESSING TARGET DATA>

| d | i | V | V' | S | path |
|---|---|---|----|---|------|
| 0 | 0 | A | A  | [] | [] |

<d'>

| d' | d | d1 | d2 | j | S' | path' |
|----|---|----|----|---|----|----|
| 10.0 | 0 | 10.0 | 10.0 | 1 | [A] | [A] |

<d1'>

| j'\j | 1 |
|------|---|
| 1 | 10.0 |
| | |
| | |

<d2'>

| V''\V' | A |
|--------|---|
| A | 10.0 |
| | |
| | |

<LIST Q>

| d | i | V | S | path |
|---|---|---|---|------|
| 10.0 | -1 | A | [A] | [A] |
| | | | | |

<LIST L>

| V | i | d |
|---|---|---|
| A | 1 | 10.0 |
| | | |

IN THE CASE OF V = V' = A AND j = 2

<PROCESSING TARGET DATA>

| d | -i | V | V' | S | path |
|---|---|---|---|---|---|
| 0 | 0 | A | A | [ ] | [ ] |

<d'>

| d' | d | d1 | d2 | j | S' | path' |
|---|---|---|---|---|---|---|
| 41.2 | 0 | 41.2 | 40.0 | 2 | [A] | [A] |

<d1'>

| j\j | 2 |
|---|---|
| 1 | 41.2 |
| 2 | 41.2 |

<d2'>

| V"\V' | A |
|---|---|
| A | 40.0 |

<LIST Q>

| d | -i | V | S | path |
|---|---|---|---|---|
| 10.0 | -1 | A | [A] | [A] |
| 41.2 | -2 | A | [A] | [A] |

<LIST L>

| V | i | d |
|---|---|---|
| A | 1 | 10.0 |
| A | 2 | 41.2 |

IN THE CASE OF V = V' = A AND j = 3

<PROCESSING TARGET DATA>

| d | -i | V | V' | S | path |
|---|---|---|---|---|---|
| 0 | 0 | A | A | [] | [] |

<d'>

| d' | d | d1 | d2 | j | S' | path' |
|---|---|---|---|---|---|---|
| | 0 | 98.5 | | 3 | [A] | [A] |

<d1'>

| j'\j | 3 |
|---|---|
| 1 | 98.5 |
| 2 | 98.5 |
| 3 | 98.5 |

<d2'>

| V''\V' | |
|---|---|
| | |
| | |
| | |

<LIST Q>

| d | -i | V | S | path |
|---|---|---|---|---|
| 10.0 | -1 | A | [A] | [A] |
| 41.2 | -2 | A | [A] | [A] |

<LIST L>

| V | i | d |
|---|---|---|
| A | 1 | 10.0 |
| A | 2 | 41.2 |

FIG. 20

<LIST Q>

| d | i | V | S | path |
|---|---|---|---|------|
| 10.0 | -1 | A | [A] | [A] |
| 41.2 | -2 | A | [A] | [A] |
| 14.1 | -1 | C | [C] | [C] |
| 31.6 | -2 | C | [C] | [C] |

<LIST L>

| V | i | d |
|---|---|---|
| A | 1 | 10.0 |
| A | 2 | 41.2 |
| C | 1 | 14.1 |
| C | 2 | 31.6 |

AFTER INITIAL DISTANCE CALCULATION PROCESS

FIG. 21

<LIST Q>

| d | -i | V | S | path |
|---|---|---|---|---|
| 10.0 | -1 | A | [A] | [A] |
| 41.2 | -2 | A | [A] | [A] |
| 14.1 | -1 | C | [C] | [C] |
| 31.6 | -2 | C | [C] | [C] |

<LIST P>

| d | -i | V | S | path |
|---|---|---|---|---|
| 10.0 | -1 | A | [A] | [A] |
| 14.1 | -1 | C | [C] | [C] |
| 31.6 | -2 | C | [C] | [C] |
| 41.2 | -2 | A | [A] | [A] |

<PROCESSING TARGET DATA IN LOOP 1>

| d | -i | V | S | path |
|---|---|---|---|---|
| 10.0 | -1 | A | [A] | [A] |

IN THE CASE OF V = A, V' = B, AND j = 1

<PROCESSING TARGET DATA>

| d | ¬i | V | V' | S | path |
|---|---|---|---|---|---|
| 10.0 | −1 | A | B | [A] | [A] |

<d'>

| d' | d | d1 | d2 | j | S' | path' |
|---|---|---|---|---|---|---|
| 110 | 10.0 | 0 | 110 | 1 | [AB] | [AB] |

<d1'>

| j'\j | — |
|---|---|
| — | — |
|  |  |
|  |  |

<d2'>

| V'\V' | B |
|---|---|
| A | 110 |
| B | 110 |

<LIST Q>

| d | ¬i | V | S | path |
|---|---|---|---|---|
|  |  |  |  |  |
|  |  |  |  |  |

<LIST L>

| V | i | d |
|---|---|---|
| A | 1 | 10.0 |
| A | 2 | 41.2 |
| C | 1 | 14.1 |
| C | 2 | 31.6 |

IN THE CASE OF V = A, V' = B, AND j = 2

<PROCESSING TARGET DATA>

| d | ¬i | V | V' | S | path |
|---|---|---|---|---|---|
| 10.0 | -1 | A | B | [A] | [A] |

<d'>

| d' | d | d1 | d2 | j | S' | path' |
|---|---|---|---|---|---|---|
| 41.2 | 10.0 | 41.2 | 41.2 | 2 | [B] | [AB] |

<d1'>

| j''\i | 2 |
|---|---|
| 2 | 41.2 |
| | |
| | |

<d2'>

| V''\V' | B |
|---|---|
| B | 41.2 |
| | |
| | |

<LIST L>

| V | i | d |
|---|---|---|
| A | 1 | 10.0 |
| A | 2 | 41.2 |
| B | 2 | 41.2 |
| C | 1 | 14.1 |
| C | 2 | 31.6 |

<LIST Q>

| d | ¬i | V | S | path |
|---|---|---|---|---|
| 41.2 | -2 | B | [B] | [AB] |
| | | | | |

IN THE CASE OF V = A, V' = C, AND j = 1

<PROCESSING TARGET DATA>

| d | ¬i | V | V' | S | path |
|---|---|---|---|---|---|
| 10.0 | −1 | A | C | [A] | [A] |

<d'>

| d' | d | d1 | d2 | j | S' | path' |
|---|---|---|---|---|---|---|
| 10.0 | 10.0 | 0 | 10.0 | 1 | [AC] | [AC] |

<d1'>

| j＼j |   |
|---|---|
| — | — |
|   |   |
|   |   |

<d2'>

| V''＼V' | C |
|---|---|
| A | 10.0 |
| C | 10.0 |

<LIST L>

| V | i | d |
|---|---|---|
| A | 1 | 10.0 |
| A | 2 | 41.2 |
| B | 2 | 41.2 |
| B | 3 | 41.2 |
| C | 1 | 10.0 |
| C | 2 | 31.6 |

<LIST Q>

| d | ¬i | V | S | path |
|---|---|---|---|---|
| 41.2 | −2 | B | [B] | [AB] |
| 41.2 | −3 | B | [B] | [AB] |
| 10.0 | −1 | A | [AC] | [AC] |

FIG. 25

<LIST Q>

| d | -i | V | S | path |
|---|---|---|---|---|
| 41.2 | -2 | B | [B] | [AB] |
| 41.2 | -3 | B | [B] | [AB] |
| 10.0 | -1 | A | [AC] | [AC] |

<LIST L>

| V | i | d |
|---|---|---|
| A | 1 | 10.0 |
| A | 2 | 41.2 |
| B | 3 | 41.2 |
| B | 2 | 41.2 |
| C | 1 | 10.0 |
| C | 2 | 31.6 |

AFTER SECOND-STAGE DISTANCE CALCULATION PROCESS (IN LOOP 1)

FIG. 26

<LIST Q>

| d | -i | V | S | path |
|---|----|---|---|------|
| 41.2 | -2 | B | [B] | [AB] |
| 41.2 | -3 | B | [B] | [AB] |
| 10.0 | -1 | C | [AC] | [AC] |

<LIST P>

| d | -i | V | S | path |
|---|----|---|---|------|
| 10.0 | -1 | C | [AC] | [AC] |
| 14.1 | -1 | C | [C] | [C] |
| 31.6 | -2 | C | [C] | [C] |
| 41.2 | -3 | B | [B] | [AB] |
| 41.2 | -2 | A | [A] | [A] |
| 41.2 | -2 | B | [B] | [AB] |

<PROCESSING TARGET DATA IN LOOP 2>

| d | -i | V | S | path |
|---|----|---|---|------|
| 10.0 | -1 | A | [AC] | [AC] |

FIG. 27

<LIST Q>

| d | -i | V | S | path |
|---|---|---|---|---|
| 30.0 | -2 | D | [D] | [ACD] |
| 31.6 | -3 | D | [D] | [ACD] |
| 41.2 | -1 | I | [ACI] | [ACI] |
| 40.0 | -2 | I | [I] | [ACI] |

<LIST L>

| V | i | d |
|---|---|---|
| A | 1 | 10.0 |
| A | 2 | 41.2 |
| B | 3 | 41.2 |
| B | 2 | 41.2 |
| C | 1 | 10.0 |
| C | 2 | 31.6 |
| D | 2 | 30.0 |
| D | 3 | 31.6 |
| I | 2 | 40.0 |

AFTER SECOND-STAGE DISTANCE CALCULATION PROCESS (IN LOOP 2)

FIG. 28

<LIST Q>

| d | -i | V | S | path |
|---|---|---|---|---|
| 30.0 | -2 | D | [D] | [ACD] |
| 31.6 | -3 | D | [D] | [ACD] |
| 40.0 | -2 | I | [I] | [ACI] |

<LIST P>

| d | -i | V | S | path |
|---|---|---|---|---|
| 30.0 | -2 | D | [D] | [ACD] |
| 31.6 | -3 | D | [D] | [ACD] |
| 31.6 | -2 | C | [C] | [C] |
| 40.0 | -2 | I | [I] | [ACI] |
| 41.2 | -3 | B | [B] | [AB] |
| 41.2 | -2 | A | [A] | [A] |
| 41.2 | -2 | B | [B] | [AB] |

<PROCESSING TARGET DATA IN LOOP 3>

| d | -i | V | S | path |
|---|---|---|---|---|
| 30.0 | -2 | D | [D] | [ACD] |

FIG. 29

<LIST Q>

| d | -i | V | S | path |
|---|---|---|---|---|
| 31.6 | -2 | E | [DE] | [ACDE] |

<LIST L>

| V | i | d |
|---|---|---|
| A | 1 | 10.0 |
| A | 2 | 41.2 |
| B | 2 | 41.2 |
| B | 3 | 41.2 |
| C | 1 | 10.0 |
| C | 2 | 31.6 |
| D | 2 | 30.0 |
| D | 3 | 31.6 |
| E | 2 | 31.6 |
| I | 2 | 40.0 |

-- AFTER SECOND-STAGE DISTANCE CALCULATION PROCESS (IN LOOP 3) --

FIG. 30

<LIST Q>

| d | -i | V | S | path |
|---|---|---|---|---|
| 31.6 | -2 | E | [DE] | [ACDE] |

<LIST P>

| d | -i | V | S | path |
|---|---|---|---|---|
| 31.6 | -3 | D | [D] | [ACD] |
| 31.6 | -2 | C | [C] | [C] |
| 31.6 | -2 | E | [DE] | [ACDE] |
| 40.0 | -2 | I | [I] | [ACI] |
| 41.2 | -3 | B | [B] | [AB] |
| 41.2 | -2 | A | [A] | [A] |
| 41.2 | -2 | B | [B] | [AB] |

<PROCESSING TARGET DATA IN LOOP 4>

| d | -i | V | S | path |
|---|---|---|---|---|
| 31.6 | -3 | D | [D] | [ACD] |

FIG. 31

<LIST P>

| d | -i | V | S | path |
|---|---|---|---|---|
| 31.6 | -2 | C | [C] | [C] |
| 31.6 | -2 | E | [DE] | [ACDE] |
| 40.0 | -2 | I | [I] | [ACI] |
| 41.2 | -3 | B | [B] | [AB] |
| 41.2 | -2 | A | [A] | [A] |
| 41.2 | -2 | B | [B] | [AB] |

<PROCESSING TARGET DATA IN LOOP 5>

| d | -i | V | S | path |
|---|---|---|---|---|
| 31.6 | -2 | C | [C] | [C] |

FIG. 32

<LIST Q>

| d | -i | V | S | path |
|---|---|---|---|---|
| 40.0 | -2 | A | [CA] | [CA] |

<LIST L>

| V | i | d |
|---|---|---|
| A | 1 | 10.0 |
| A | 2 | 40.0 |
| B | 2 | 41.2 |
| B | 3 | 41.2 |
| C | 1 | 10.0 |
| C | 2 | 31.6 |
| D | 2 | 30.0 |
| D | 3 | 31.6 |
| E | 2 | 31.6 |
| I | 2 | 40.0 |

AFTER SECOND-STAGE DISTANCE CALCULATION PROCESS (IN LOOP 5)

FIG. 33

<LIST Q>

| d | -i | V | S | path |
|---|---|---|---|---|
| 40.0 | -2 | A | [CA] | [CA] |

<LIST P>

| d | -i | V | S | path |
|---|---|---|---|---|
| 31.6 | -2 | E | [DE] | [ACDE] |
| 40.0 | -2 | I | [I] | [ACI] |
| 40.0 | -2 | A | [CA] | [CA] |
| 41.2 | -3 | B | [B] | [AB] |
| 41.2 | -2 | A | [A] | [A] |
| 41.2 | -2 | B | [B] | [AB] |

<PROCESSING TARGET DATA IN LOOP 6>

| d | -i | V | S | path |
|---|---|---|---|---|
| 31.6 | -2 | E | [DE] | [ACDE] |

FIG. 34

<LIST Q>

| d | -i | V | S | path |
|---|----|---|---|------|
| 31.6 | -2 | F | [DEF] | [ACDEF] |
| 36.1 | -3 | F | [F] | [ACDEF] |

<LIST L>

| V | i | d |
|---|---|---|
| A | 1 | 10.0 |
| A | 2 | 40.0 |
| B | 2 | 41.2 |
| B | 3 | 41.2 |
| C | 1 | 10.0 |
| C | 2 | 31.6 |
| D | 2 | 30.0 |
| D | 3 | 31.6 |
| E | 2 | 31.6 |
| F | 2 | 31.6 |
| F | 3 | 36.1 |
| I | 2 | 40.0 |

-- AFTER SECOND-STAGE DISTANCE CALCULATION PROCESS (IN LOOP 6) --

FIG. 35

<LIST Q>

| d | -i | V | S | path |
|---|---|---|---|---|
| 31.6 | -2 | F | [DEF] | [ACDEF] |
| 36.1 | -3 | F | [F] | [ACDEF] |

<LIST P>

| d | -i | V | S | path |
|---|---|---|---|---|
| 31.6 | -2 | F | [DEF] | [ACDEF] |
| 36.1 | -3 | F | [F] | [ACDEF] |
| 40.0 | -2 | I | [I] | [ACI] |
| 40.0 | -2 | A | [CA] | [CA] |
| 41.2 | -3 | B | [B] | [AB] |
| 41.2 | -2 | B | [B] | [AB] |

<PROCESSING TARGET DATA IN LOOP 7>

| d | -i | V | S | path |
|---|---|---|---|---|
| 31.6 | -2 | F | [DEF] | [ACDEF] |

FIG. 36

<LIST Q>

| d | i | V | S | path |
|---|---|---|---|---|
| 42.4 | -2 | G | [DEFG] | [ACDEFG] |

<LIST L>

| V | i | d |
|---|---|---|
| A | 1 | 10.0 |
| A | 2 | 40.0 |
| B | 2 | 41.2 |
| B | 3 | 41.2 |
| C | 1 | 10.0 |
| C | 2 | 31.6 |
| D | 2 | 30.0 |
| D | 3 | 31.6 |
| E | 2 | 31.6 |
| F | 2 | 31.6 |
| F | 3 | 36.1 |
| G | 2 | 42.4 |
| I | 2 | 40.0 |

AFTER SECOND-STAGE DISTANCE CALCULATION PROCESS (IN LOOP 7)

FIG. 37

<LIST Q>

| d | -i | V | S | path |
|---|---|---|---|---|
| 42.4 | -2 | G | [DEFG] | [ACDEFG] |

<LIST P>

| d | -i | V | S | path |
|---|---|---|---|---|
| 36.1 | -3 | F | [F] | [ACDEF] |
| 40.0 | -2 | I | [I] | [ACI] |
| 40.0 | -2 | A | [CA] | [CA] |
| 41.2 | -3 | B | [B] | [AB] |
| 41.2 | -2 | B | [B] | [AB] |
| 42.4 | -2 | G | [DEFG] | [ACDEFG] |

<PROCESSING TARGET DATA IN LOOP 8>

| d | -i | V | S | path |
|---|---|---|---|---|
| 36.1 | -3 | F | [F] | [ACDEF] |

FIG. 38

<LIST P>

| d | -i | V | S | path |
|---|---|---|---|---|
| 40.0 | -2 | I | [I] | [ACI] |
| 40.0 | -2 | A | [CA] | [CA] |
| 41.2 | -3 | B | [B] | [AB] |
| 41.2 | -2 | B | [B] | [AB] |
| 42.4 | -2 | G | [DEFG] | [ACDEFG] |

<PROCESSING TARGET DATA IN LOOP 9>

| d | -i | V | S | path |
|---|---|---|---|---|
| 40.0 | -2 | I | [I] | [ACI] |

FIG. 39

<LIST Q>

| d | -i | V | S | path |
|---|---|---|---|---|
| 40.0 | -3 | J | [J] | [ACIJ] |
| 40.0 | -4 | J | [J] | [ACIJ] |

<LIST L>

| V | i | d |
|---|---|---|
| A | 1 | 10.0 |
| A | 2 | 40.0 |
| B | 2 | 41.2 |
| B | 3 | 41.2 |
| C | 1 | 10.0 |
| C | 2 | 31.6 |
| D | 2 | 30.0 |
| D | 3 | 31.6 |
| E | 2 | 31.6 |
| F | 2 | 31.6 |
| F | 3 | 36.1 |
| G | 2 | 42.4 |
| I | 2 | 40.0 |
| J | 3 | 40.0 |
| J | 4 | 40.0 |

AFTER SECOND-STAGE DISTANCE CALCULATION PROCESS (IN LOOP 9)

FIG. 40

<LIST Q>

| d | -i | V | S | path |
|---|---|---|---|---|
| 40.0 | -3 | J | [J] | [ACIJ] |
| 40.0 | -4 | J | [J] | [ACIJ] |

<LIST P>

| d | -i | V | S | path |
|---|---|---|---|---|
| 40.0 | -4 | J | [J] | [ACIJ] |
| 40.0 | -3 | J | [J] | [ACIJ] |
| 40.0 | -2 | A | [CA] | [CA] |
| 41.2 | -3 | B | [B] | [AB] |
| 41.2 | -2 | B | [B] | [AB] |
| 42.4 | -2 | B | [DEFG] | [ACDEFG] |

<PROCESSING TARGET DATA IN LOOP 10>

| d | -i | V | S | path |
|---|---|---|---|---|
| 40.0 | -4 | J | [J] | [ACIJ] |

FIG. 41

| NODE ID | X COORDINATE | Y COORDINATE |
|---------|--------------|--------------|
| A | 10 | 80 |
| C | 10 | 70 |
| I | 10 | 0 |
| J | 110 | 0 |

ROUTE INFORMATION PROCESSING APPARATUS AND ROUTE INFORMATION PROCESSING METHOD

CROSS-REFERENCE TO RELATED APPLICATION

This application is based upon and claims the benefit of priority of the prior Japanese Patent Application No. 2014-246250, filed on Dec. 4, 2014, the entire contents of which are incorporated herein by reference.

FIELD

The embodiment discussed herein is related to a route information processing apparatus and a route information processing method.

BACKGROUND

In spatial information analysis, the analysis of the route of a movable body is performed.

Japanese Laid-open Patent Publication No. 2004-325083 or H. Alt, A. Efrat, G. Rote, and C. Wenk, "Matching planar maps", J. Algorithms 49, 262-283, 2003 discloses related art.

SUMMARY

According to an aspect of the embodiments, a route information processing apparatus includes: a processor configured to execute a program; and a memory configured to store the program, wherein, based on the program, the processor performs operations to: calculate maximum values corresponding to a Frechet distance between one line segment of one or more line segments between observation points included in a trajectory and each of sets of two nodes corresponding to the one line segment, the nodes being included in a route graph including linked paths which link nodes; and acquire a path corresponding to the trajectory having a smallest value among the maximum values of the one or more line segments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of trajectory data;

FIG. 3 illustrates an example of a route graph;

FIGS. 6A and 6B illustrate an example of a correspondence between a line segment between observation points on a trajectory and a node on a route graph;

FIG. 8 illustrates an example of a matrix;

FIG. 20 illustrates an example of a list Q and an example of a list L after an initial distance calculation process;

FIG. 21 illustrates an example of extraction of target processing data in a first loop;

FIG. 25 illustrates an example of a list;
FIG. 26 illustrates an example of a list;
FIG. 27 illustrates an example of a list;
FIG. 28 illustrates an example of a list;
FIG. 29 illustrates an example of a list;
FIG. 30 illustrates an example of a list;
FIG. 31 illustrates an example of a list;
FIG. 32 illustrates an example of a list;
FIG. 33 illustrates an example of a list;
FIG. 34 illustrates an example of a list;
FIG. 35 illustrates an example of a list;
FIG. 36 illustrates an example of a list;
FIG. 37 illustrates an example of a list;
FIG. 38 illustrates an example of a list;
FIG. 39 illustrates an example of a list;
FIG. 40 illustrates exemplary lists; and
FIG. 41 illustrates an example of normalized trajectory data.

DESCRIPTION OF EMBODIMENT

For example, an origin-destination (OD) search to retrieve a route from a specified origin to a specified destination from among a plurality of trajectories of trajectory data acquired through actual observation is performed. From a plurality of trajectories, the analysis of a frequently appearing OD representing the combination of an origin and a destination appearing a certain number of times (for example, ten times) or more, such as Shinjyuku station and Shibuya station, Shinagawa station and Ikebukuro station, or the like, is performed. From among trajectories, a partial route search such as retrieving a route, for example, Shinagawa station→(Yamanote-line clockwise)→Ikebukuro station is performed. From trajectories, the analysis of a frequently appearing partial route representing a partial route appearing a certain number of times (for example, ten times) or more is performed.

Trajectory data representing trajectories used for route analysis include errors and are acquired at different observation times, and therefore it is difficult to use the trajectory data for route analysis as they are. As an initial process for route analysis, for example, each trajectory is associated with a simple route graph obtained by integrating a plurality of trajectories.

For example, the matching to the route graph is performed using a graph search algorithm. The matching is performed so that the minimum sum of the distances between an observation point on the trajectory and a link on the route graph is obtained.

As a similarity degree between the route graph and the trajectory, a Frechet distance is used, and a path having a similarity level degree to or greater than a threshold is extracted from the route graph as a path corresponding to the trajectory.

For example, in a case where the matching is performed so that the minimum sum of the distances between an observation point on the trajectory and a link on the route graph is obtained, the estimation of a distance may not be correctly performed if the trajectory includes a U-turn or a loop where the direction of movement changes.

In a case where a Frechet distance is used as a similarity degree between a trajectory and a route graph, the direction of movement is taken into consideration. For example, in a case where a Frechet distance is used, a path having the highest similarity degree may not be extracted when extracting a path having a similarity degree equal to or greater than a threshold with respect to a trajectory. Accordingly, an algorithm for extracting a path having a similarity degree equal to or greater than a threshold is repeatedly used to extract a path having the highest similarity degree. In order to extract a path having the highest similarity degree, the calculation of similarity degrees of all paths included in the route graph may be performed in a round-robin manner.

Figure 1:
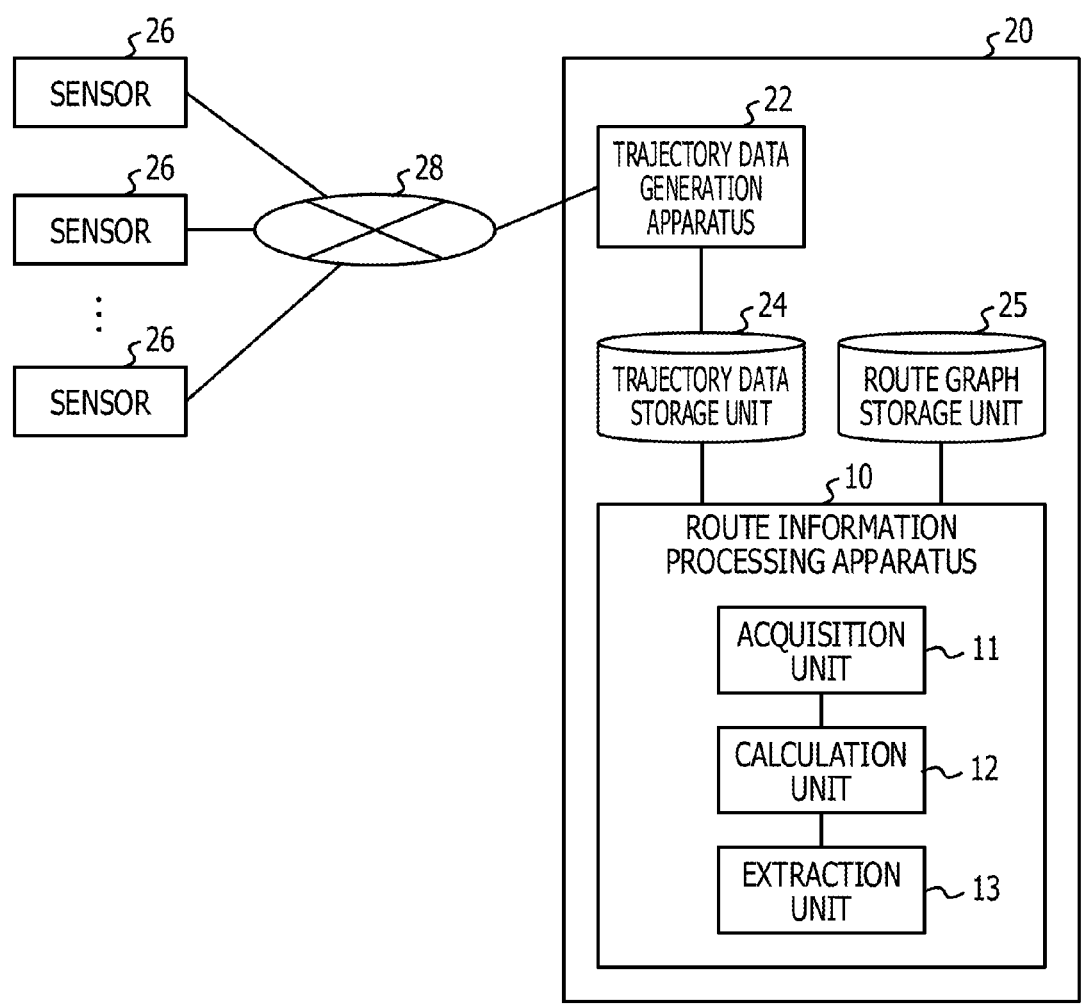
FIG. 1 illustrates an example of a route information processing system.

FIG. 1 illustrates an example of a route information processing system. An route information processing apparatus 10 illustrated in FIG. 1 is included in a route information processing system 20 along with a trajectory data generation apparatus 22, a trajectory data storage unit 24, and a route graph storage unit 25.

The trajectory data generation apparatus 22 acquires, via a network 28, observation data representing the position of a movable body periodically observed by each sensor 26 that observes the position of the movable body. The sensor 26 may be the Global Positioning System (GPS) or the like used by a terminal such as a mobile phone or a smartphone held by a person that represents an example of a movable body, a car navigation system in a vehicle that represents an example of a movable body or the like. The observation data include location data represented by the latitude and longitude of each observation point, an observation time, and a sensor ID to identify the sensor 26. The trajectory data generation apparatus 22 classifies the acquired observation data according to sensor ID, and chronologically arranges location data included in each of observation data based on observation time to generate trajectory data. The trajectory data specifies a trajectory along which a movable body has moved. The trajectory data generation apparatus 22 stores the generated trajectory data in the trajectory data storage unit 24.

FIG. 2 illustrates an example of trajectory data. For example, as illustrated in FIG. 2, in the trajectory data storage unit 24, the identifier of the trajectory data (a trajectory ID, for example, a sensor ID), the identifier of each observation point (an observation point ID) included in the trajectory, and the x coordinate and y coordinate of each observation point are associated with one another and stored. The x coordinate and the y coordinate are, for example, a latitude and a longitude, respectively.

The route graph storage unit 25 stores a route graph. A route graph is generated by integrating a plurality of trajectories and is represented by a plurality of nodes and links between nodes. FIG. 3 illustrates an example of a route graph. For example, as illustrated in FIG. 3, the route graph storage unit 25 stores the identifier of each node (a node ID) and the x coordinate and y coordinate of each node which are associated with each other, and further stores link information. Referring to FIG. 3, the link information is represented in a format in which the node IDs of nodes at both ends of a link are coupled by an underscore ("_"). In the following description, an observation point having the observation point ID of i may be represented as an "observation point i", and a node having the node ID of X may be represented as a "node X".

The trajectory data storage unit 24 may be a storage device included in the trajectory data generation apparatus 22 or may be provided as an external apparatus different from the trajectory data generation apparatus 22. Each of the trajectory data storage unit 24 and the route graph storage unit 25 may be a portable storage medium such as a compact disc read-only memory (CD-ROM), a digital versatile disc read-only memory (DVD-ROM), or a Universal Serial Bus (USB) memory.

As illustrated in FIG. 1, the route information processing apparatus 10 includes an acquisition unit 11, a calculation unit 12, and an extraction unit 13.

The acquisition unit 11 acquires single trajectory data to be subjected to normalization from the trajectory data storage unit 24 using a trajectory ID. The acquisition unit 11 acquires a route graph from the route graph storage unit 25. The whole route graph or a part route graph including the trajectory data to be subjected to normalization may be acquired.

Figure 4:
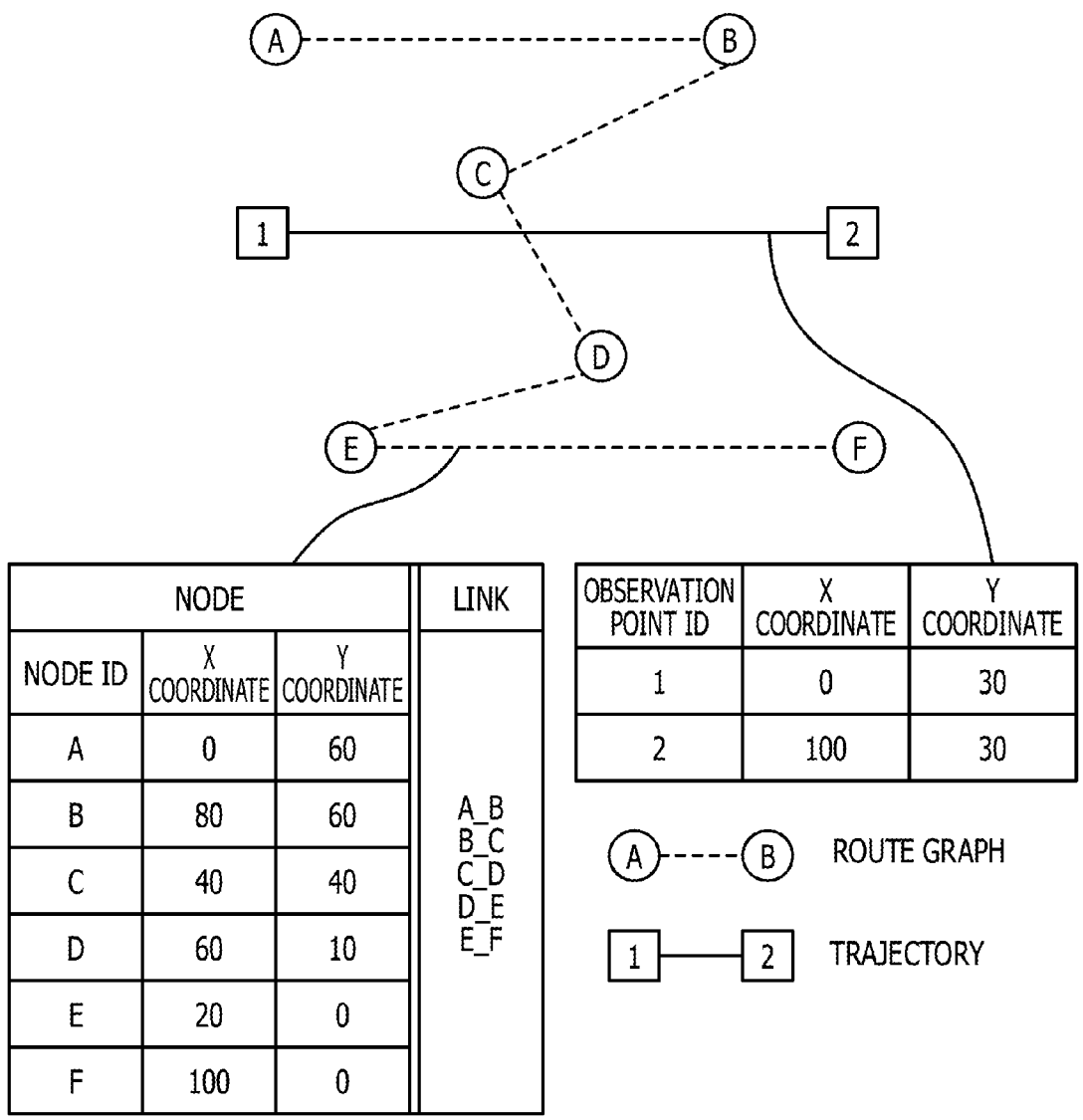
FIG. 4 illustrates an example of a trajectory and an example of a route graph.

FIG. 4 illustrates an example of a trajectory and an example of a route graph. FIG. 4 illustrates a trajectory represented by trajectory data and a route graph that are acquired by the acquisition unit 11. In FIG. 4, each observation point on the trajectory is represented by an observation point ID in a rectangular box, and the observation points that are chronologically arranged are coupled by a solid line segment. Each node on the route graph is represented by a node ID in a circle, and each link between the nodes is represented by a broken line. In the following drawings, the same method of representing a trajectory and a route graph may be employed. The observation points in the trajectory data are assigned with observation point IDs=1, 2, . . . in chronological order. The order of nodes on a route graph may be determined based on link information between nodes and node IDs. For example, in FIG. 4, the nodes on the route graph may be arranged in the order of A→B→C→D→E→F.

The calculation unit 12 calculates the similarity degree between a line segment between observation points on a trajectory and a path represented by the series of nodes corresponding to the line segment.

As a similarity degree in consideration of the direction of movement of a movable body represented by a trajectory, a Frechet distance is used. The Frechet distance may be the maximum value of a distance between corresponding points where a trajectory and a route graph are associated with each other. A path on a route graph which has the shortest Frechet distance to a trajectory is extracted as a normalized trajectory using a graph search algorithm. The normalization of a trajectory is efficiently performed in consideration of the direction of movement.

Figure 5:
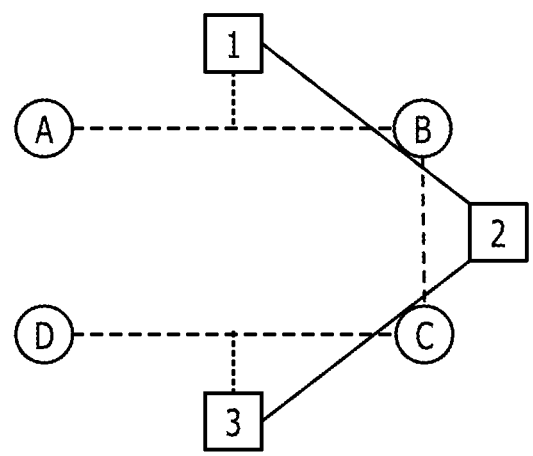
FIG. 5 illustrates an example of a correspondence between a line segment between observation points on a trajectory and a node on a route graph.

FIGS. 5, 6A, and 6B illustrate an example of a correspondence between a line segment between observation points on a trajectory and a node on a route graph. For example, as illustrated in FIG. 5, in a case where the one-to-one correspondence is found between a line segment between observation points on a trajectory and a node on a route graph, the distance between the line segment and the node, which is nearest to the line segment, may be calculated. For example, as illustrated in FIGS. 6A and 6B, in a case where a plurality of nodes correspond to a single line segment, a calculation cost may be high. For example, the node corresponding to the line segment may be a node located within a certain distance of the line segment. The distance between a trajectory and a route graph may be obtained by calculating the distance between a link on the route graph and a corresponding observation point on the trajectory. In this case also, in a case where a plurality of observation points correspond to a single link, a calculation cost may be high.

In a case where a plurality of nodes correspond to a single line segment, it may be difficult to extract a path accurately reflecting a trajectory if the nodes are not associated with the line segment in correct order. For example, in a case where the correspondence between a line segment and each node is established using a perpendicular line extending from the node to the line segment so that the shortest distance between the node and the line segment is achieved, points on the line segment corresponding to the nodes may be arranged in the order of A→C→B→D, which may be different from the original order of A→B→C→D as illustrated in FIG. 6A. In order to keep the original node order of A→B→C→D, the correspondence between a line segment and each node may be established in consideration of the order of the nodes as illustrated in FIG. 6B.

Figure 7:
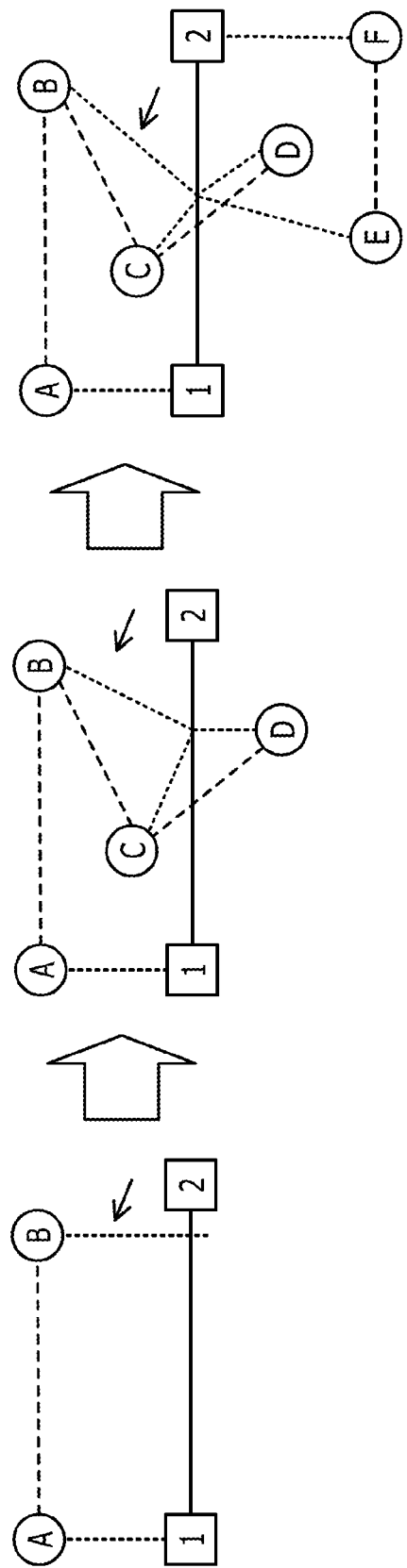
FIG. 7 illustrates an example of a correspondence between a line segment between observation points on a trajectory and a node on a route graph at the time of updating.

FIG. 7 illustrates an example of a correspondence between a line segment between observation points on a trajectory and a node on a route graph at the time of updating. As illustrated in FIG. 7, in a case where a path corresponding to a trajectory is updated while searching for an adjacent node, the correspondence may be changed. In FIG. 7, a point on the line segment between an observation point 1 and an observation point 2 (a line segment between an observation point i and an observation point (i+1) is hereinafter referred to as a "line segment i_i+1) corresponding to a node B is changed each time node searching is performed, such as the node B, . . . , a node D, . . . , and a node F. Each time the point is changed, the distance between the node and the line segment is recalculated, which may lead to an increase in calculation cost.

The calculation unit 12 does not determine a point on a line segment in a trajectory which corresponds to a node on a route graph, and calculates the distance between the line segment and the corresponding node. In a case where a plurality of nodes correspond to a line segment, the calculation unit 12 calculates the Frechet distance between each set of two of the plurality of nodes and the line segment and sets one of the calculated Frechet distances which has the maximum value as the similarity degree between the line segment and a path including the nodes corresponding to the line segment.

For example, a Frechet distance $\epsilon_0$ between a trajectory (the observation points 1 and 2) and a route graph (path: nodes A→B→C→D→E→F), which are illustrated in FIG. 4, is calculated. For example, the nodes A, B, C, D, E, and F correspond to a line segment 1_2.

One node in the set of two nodes is defined as a node X, and the other one node is defined as a node Y. One of the Frechet distance between the line segment 1_2 and the node X and the Frechet distance between the line segment 1_2 and the node Y which has a larger value is defined as $\epsilon_{X,\,Y}$. The calculation unit 12 calculates the Frechet distance $\epsilon_{X,\,Y}$ for each set of the node X and the node Y. FIG. 8 illustrates an example of a matrix. The matrix illustrated in FIG. 8 is used for the calculation of the Frechet distance $\epsilon_{X,\,Y}$ between a line segment and a set of two nodes. As illustrated in FIG. 8, the Frechet distances $\epsilon_{X,\,Y}$ of all sets of the node X and the node Y are recorded in corresponding cells in the matrix. The calculation unit 12 sets the maximum value of the Frechet distance $\epsilon_{X,\,Y}$ in the matrix, for example, "42.4" in FIG. 8, as the Frechet distance $\epsilon_0$ representing the similarity degree between the line segment 1_2 and the route graph.

Figure 9:
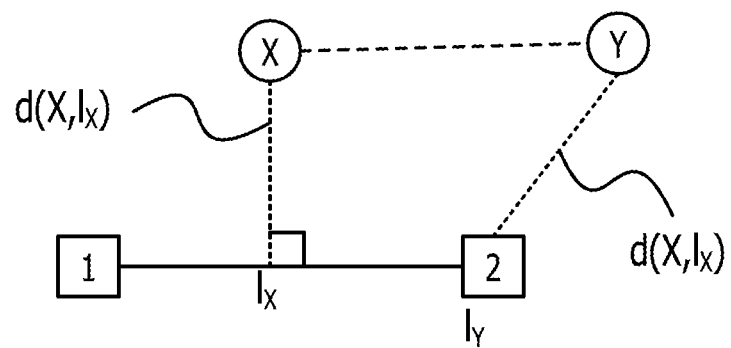
FIG. 9 illustrates an example of a shortest distance between a node and a line segment.

The calculation unit 12 may calculate each Frechet distance $\epsilon_{X,\,Y}$ as follows to take the order of nodes into account. FIG. 9 illustrates an example of a shortest distance between a node and a line segment. As illustrated in FIG. 9, the shortest distance between each node and the line segment is calculated. In a case where the foot of a perpendicular line dropped from a node to the line segment is included in the line segment, the length of the perpendicular line may be the shortest distance. In a case where the foot of a perpendicular line dropped from a node to the line segment is not included in the line segment, the distance between the node and one of observation points nearer to the node may be the shortest distance. The foot of a perpendicular line dropped from a node X or one of observation points nearer to the node X is defined as $I_X$, and the shortest distance between the node X and the line segment is defined as $d(X, I_X)$. The foot of a perpendicular line dropped from a node Y or one of observation points nearer to the node Y is defined as $I_Y$, and the shortest distance between the node Y and the line segment is defined as $d(Y, I_Y)$. In a case where $I_X$ and $I_Y$ are arranged in the same order in which corresponding nodes are arranged, one of $d(X, I_X)$ and $d(Y, I_Y)$ having a larger value is set as the Frechet distance $\epsilon_{X,\,Y}$. For example, in a case where the nodes X and Y are arranged in this order and $I_X$ is nearer to the observation point 1 on the line segment 1_2 than $I_Y$, $I_X$ and $I_Y$ may be determined to be arranged in the same order in which the nodes X and Y are arranged.

Figures 10A, 10B, 10C:
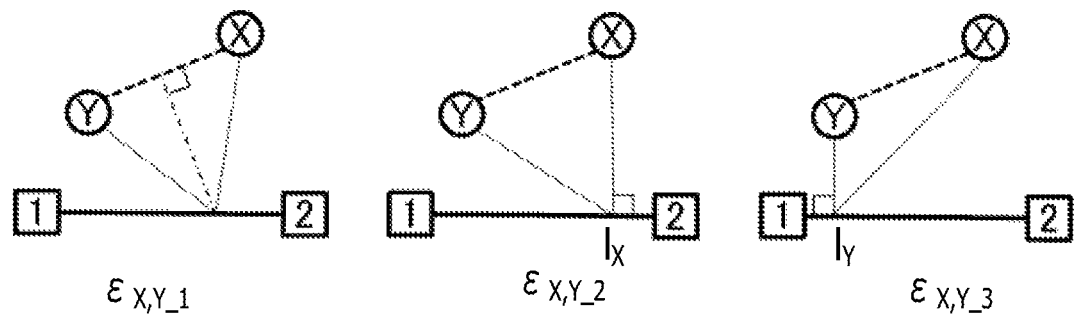
FIGS. 10A, 10B, and 10C illustrate an example of a method of calculating a Frechet distance.

FIGS. 10A, 10B, and 10C illustrate an example of a method of calculating a Frechet distance. FIGS. 10A, 10B, and 10C illustrate a method of calculating the Frechet distance $\epsilon_{X,\,Y}$ in a case where the order of nodes is reversed. In a case where $I_X$ and $I_Y$ are not arranged in the same order as the corresponding nodes arranged, the calculation unit 12 calculates a distance $\epsilon_{X,\,Y\_1}$ from the intersection of a perpendicular bisector of a line segment between the two nodes and the line segment to the node X or Y as illustrated in FIG. 10A. The calculation unit 12 calculates a distance $\epsilon_{X,\,Y\_2}$ that is the longer one of the distance between $I_X$ and the node X and the distance between $I_X$ and the node Y as illustrated in FIG. 10B. The calculation unit 12 calculates a distance $\epsilon_{X,\,Y\_3}$ that is the longer one of the distance between $I_Y$ and the node X and the distance between $I_Y$ and the node Y as illustrated in FIG. 10C. The calculation unit 12 sets the shortest one of the distance $\epsilon_{X,\,Y\_1}$, the distance $E_{m-2}$, and the distance $\epsilon_{X,\,Y\_3}$ as the Frechet distance $\epsilon_{X,\,Y}$.

All of the distance $\epsilon_{X,\,Y\_1}$, the distance $\epsilon_{X,\,Y\_2}$, and the distance $\epsilon_{X,\,Y\_3}$ may be calculated and compared with one another, or the Frechet distance $\epsilon_{X,\,Y}$ may be calculated according to a case as follows. $d(X, I_X)$ and $d(Y, I_Y)$ are calculated. In the case of $d(X, I_X) \geq d(Y, I_Y)$, $d(X, I_X)$ is set as the Frechet distance $\epsilon_{X,Y}$. In the case of $d(X, I_X) < d(Y, I_Y)$, $d(Y, I_Y)$ is set as the Frechet distance $\epsilon_{X,Y}$. In the other cases, the distance $\epsilon_{X,Y\_1}$ is set as the Frechet distance $\epsilon_{X,Y}$.

Figure 11:
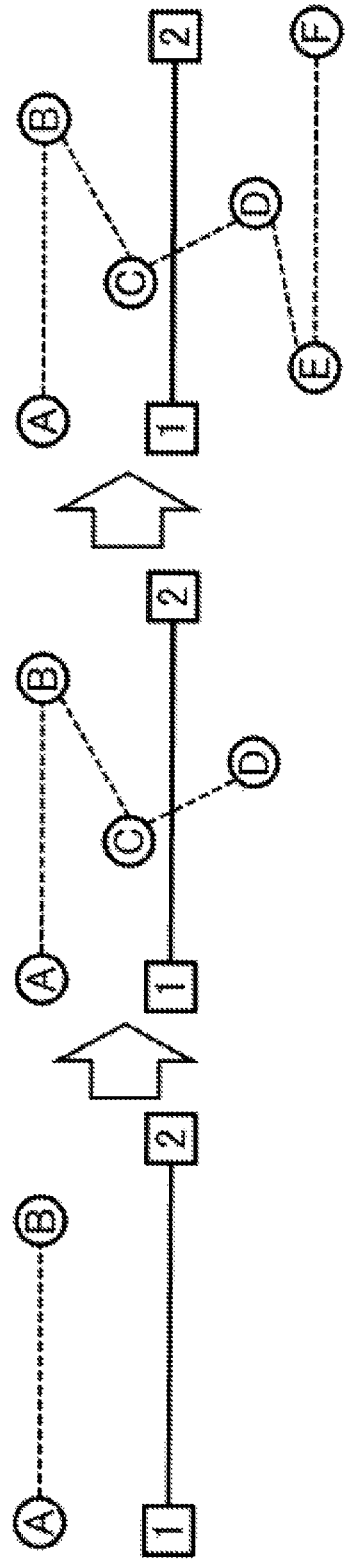
FIG. 11 illustrates an example of a method of calculating a Frechet distance.

FIG. 11 illustrates an example of a method of calculating a Frechet distance. FIG. 11 illustrates the calculation of the Frechet distance $\epsilon_{X,Y}$ between a line segment and two nodes at the time of updating. In a case where the calculation unit 12 updates a path while sequentially searching for a node adjacent to a node included in the extracted path, the calculation unit 12 calculates the Frechet distance $\epsilon_{X,Y}$ of a set of newly retrieved nodes as illustrated in FIG. 11. The calculation unit 12 compares the maximum value of the Frechet distance $\epsilon_{X,Y}$ calculated before the updating, for example, a value in a thick-line frame in each matrix illustrated in FIG. 11, with each of newly calculated Frechet distances $\epsilon_{X,Y}$. The maximum value of the Frechet distance $\epsilon_{X,Y}$ is set as the Frechet distance $\epsilon_0$ representing the similarity degree between a trajectory and a route graph.

The extraction unit 13 extracts a path corresponding to a trajectory so that the similarity degree with respect to each line segment included in the trajectory, which has been calculated by the calculation unit 12, is maximized, for example, the Frechet distance $\epsilon_0$ is minimized. The extraction unit 13 outputs the coordinates of each node included in the extracted path and link information as normalized trajectory data.

Figure 12:
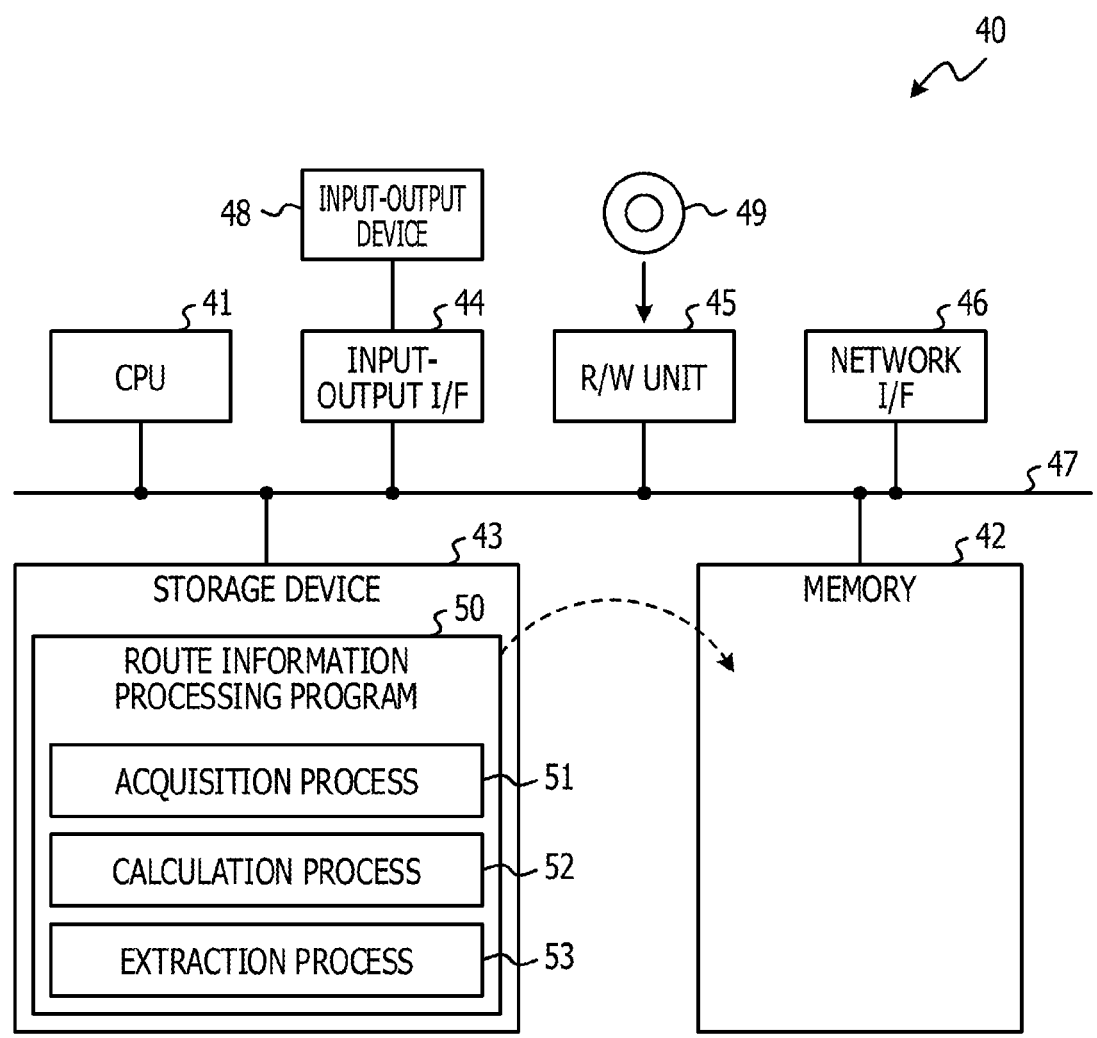
FIG. 12 illustrates an example of a computer.

FIG. 12 illustrates an example of a computer. The route information processing apparatus 10 may be realized by, for example, a computer 40 illustrated in FIG. 12. The computer 40 includes a CPU 41, a memory 42 as a temporary storage, and a nonvolatile storage device 43. The computer 40 further includes an input-output interface (I/F) 44 to which an input-output device 48 is coupled. The computer 40 further includes a read/write (R/W) unit 45 for controlling reading and writing of data from and to a recording medium 49 and a network I/F 46 coupled to a network such as the Internet. The CPU 41, the memory 42, the storage device 43, the input-output I/F 44, the R/W unit 45, and the network I/F 46 are coupled to one another via a bus 47.

The storage device 43 may be a hard disk drive (HDD), a solid state drive (SSD), or a flash memory. The storage device 43 functioning as a storage medium stores a route information processing program 50 for causing the computer 40 to function as the route information processing apparatus 10.

The CPU 41 reads the route information processing program 50 from the storage device 43, decompresses the route information processing program 50 in the memory 42, and sequentially executes processes included in the route information processing program 50. The route information processing program 50 includes an acquisition process 51, a calculation process 52, and an extraction process 53.

The CPU 41 may operate as the acquisition unit 11 illustrated in FIG. 1 by executing the acquisition process 51. The CPU 41 may operate as the calculation unit 12 illustrated in FIG. 1 by executing the calculation process 52. The CPU 41 may operate as the extraction unit 13 illustrated in FIG. 1 by executing the extraction process 53. The computer 40 that executes the route information processing program 50 functions as the route information processing apparatus 10.

The route information processing apparatus 10 may be realized by, for example, a semiconductor integrated circuit such as an application specific integrated circuit (ASIC).

Figure 13:
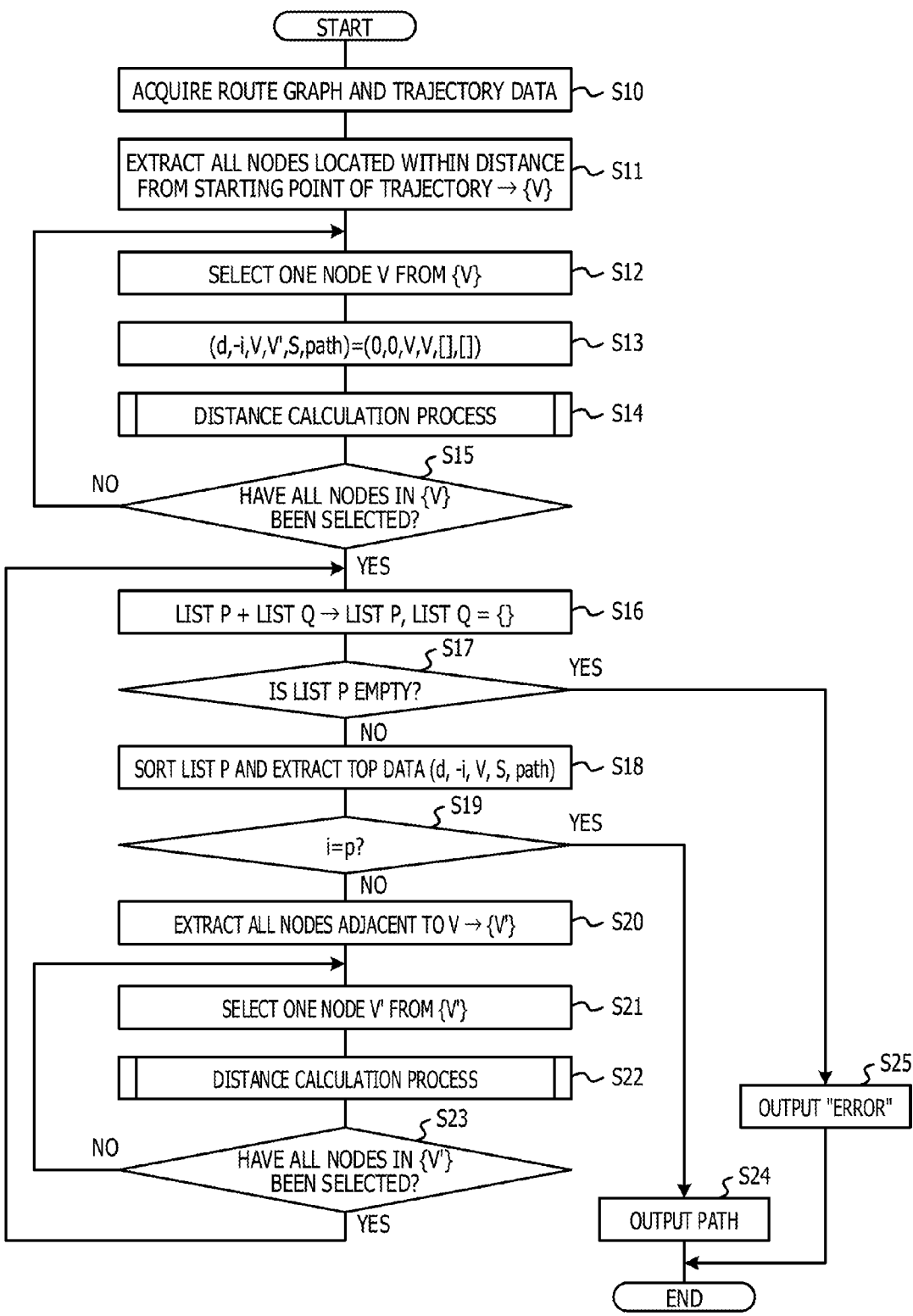
FIG. 13 illustrates an example of a route information process.
Figure 14:
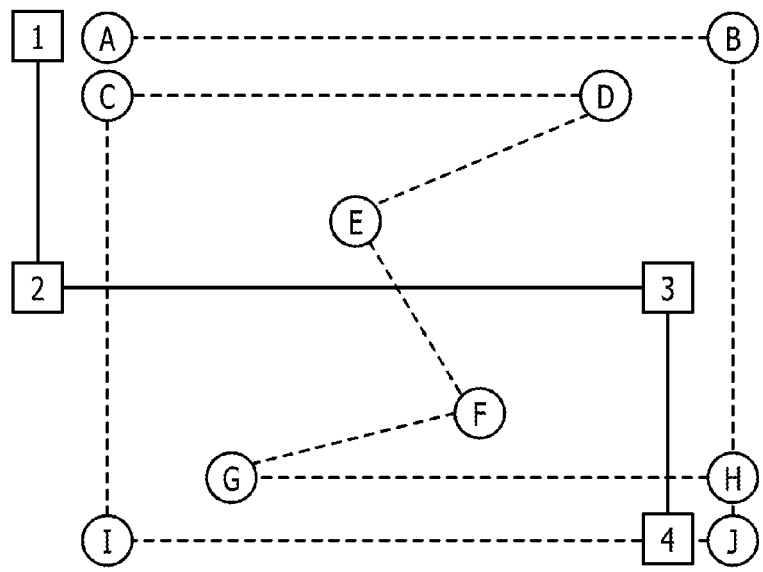
FIG. 14 illustrates an example of a trajectory and an example of a route graph.
Figure 15:
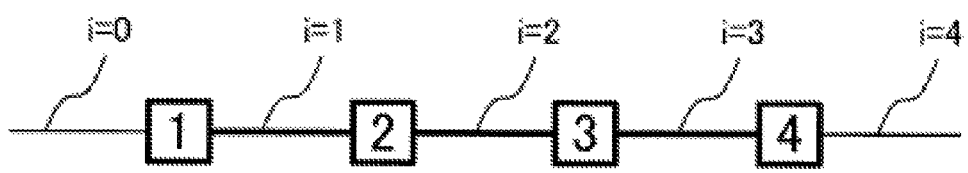
FIG. 15 illustrates an example of a number of a line segment.

FIG. 13 illustrates an example of a route information process. FIG. 14 illustrates an example of trajectory and an example of a route graph. FIG. 15 illustrates an example of exemplary a number of a line segment. The trajectory data generation apparatus 22 acquires observation data acquired by each of the sensors 26 via the network 28, generates trajectory data from the observation data, and stores the trajectory data in the trajectory data storage unit 24. A route graph is stored in the route graph storage unit 25 in advance. In this state, the route information processing apparatus 10 executes a route information processing routine illustrated in FIG. 13. The route information processing routine executed by the route information processing apparatus 10 may be an example of a route information processing method.

In operation S10 in the route information process illustrated in FIG. 13, the acquisition unit 11 acquires a route graph from the route graph storage unit 25 and acquires trajectory data to be normalized from the trajectory data storage unit 24. FIG. 14 illustrates an example of a trajectory and an example of a route graph. For example, the route graph and the trajectory data illustrated in FIG. 14 may be acquired.

In operation S11, the extraction unit 13 extracts all nodes within a distance c from a starting point of a trajectory, for example, an observation point 1 illustrated in FIG. 14, and sets a node set $\{V\}$ of the nodes. The distance c is to determine a node corresponding to a line segment between observation points, and may be, for example, $\epsilon=50$. $\{V\}=\{A, C\}$ is set.

In operation S12, the extraction unit 13 selects a node V from the node set $\{V\}$. For example, a node A may be selected.

In operation S13, the extraction unit 13 sets target processing data (d, -i, V, V', S, path). d represents a Frechet distance $\epsilon_{-0}$ between a retrieved line segment and a path. i represents a number to identify the line segment between observation points and indicates how far the line segment corresponding to the node V has been searched. As illustrated in FIG. 15, line segments including a virtual line segment set before the starting point of the trajectory and a virtual line segment set after the end point of the trajectory are sequentially assigned numbers i=0, 1, 2, .... V represents a retrieved node, V' represents a node that is adjacent to the node V and is being retrieved. S represents the arrangement of nodes corresponding to an ith line segment (taking the order of the nodes into account). "path" represents a retrieved path. Operation S13 is at the start of retrieval, d=0, i=0, V'=V, S=[ ] (empty), and path 32 [ ] are set as initial values.

Figure 16:
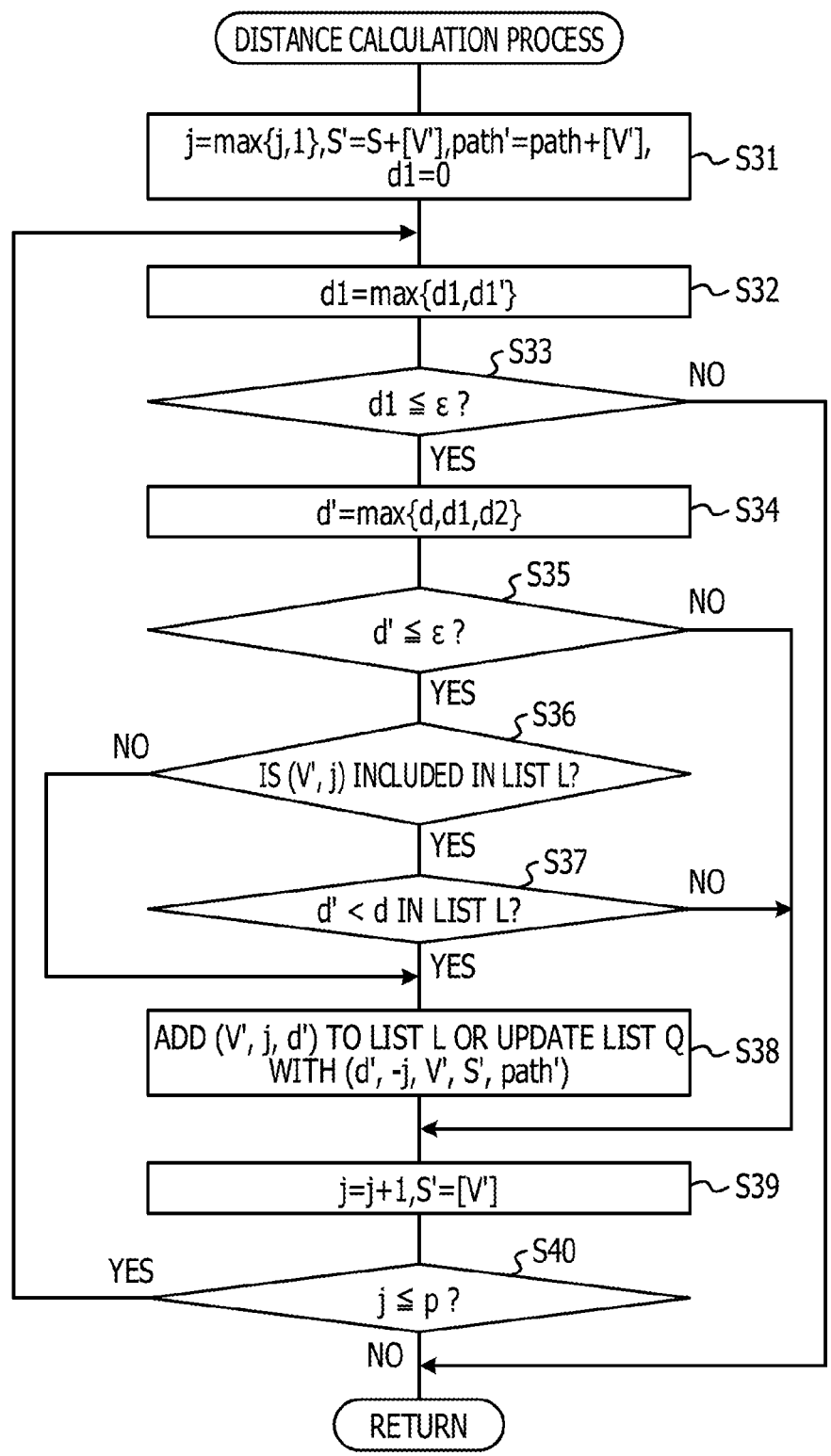
FIG. 16 illustrates an example of a distance calculation process.

FIG. 16 illustrates an example of a calculation process. In operation S14, the calculation unit 12 performs the distance calculation process illustrated in FIG. 16. In order to differentiate the distance calculation process performed in operation S14 from a distance calculation process performed in operation S22, the distance calculation process performed in operation S14 may be referred to as "initial distance calculation process". The distance calculation process performed in operation S22 may be referred to as "second-stage distance calculation process".

Figure 17:
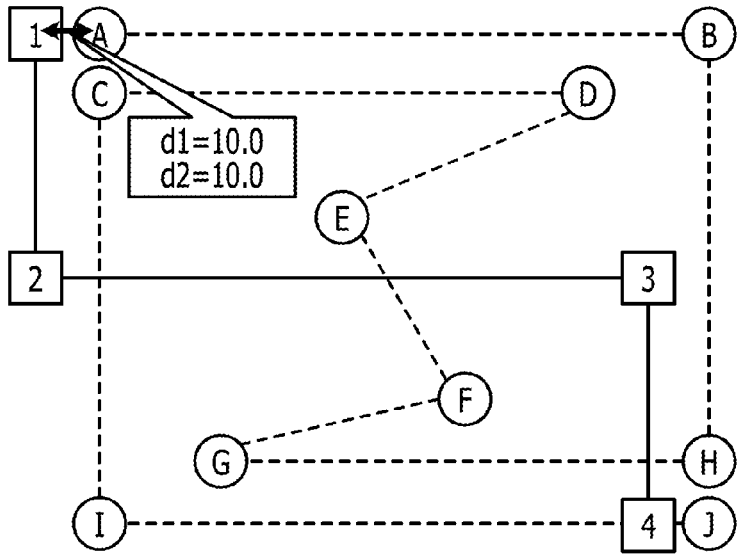
FIG. 17 illustrates an example of an initial distance calculation process.
Figure 18:
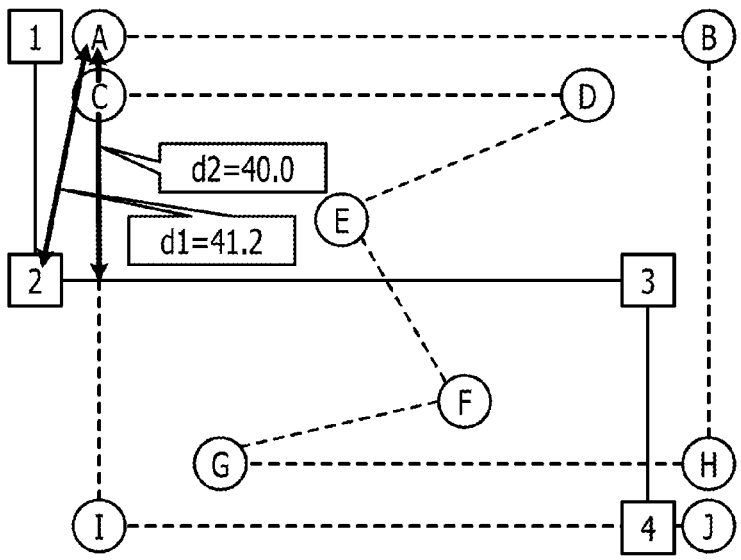
FIG. 18 illustrates an example of an initial distance calculation process.
Figure 19:
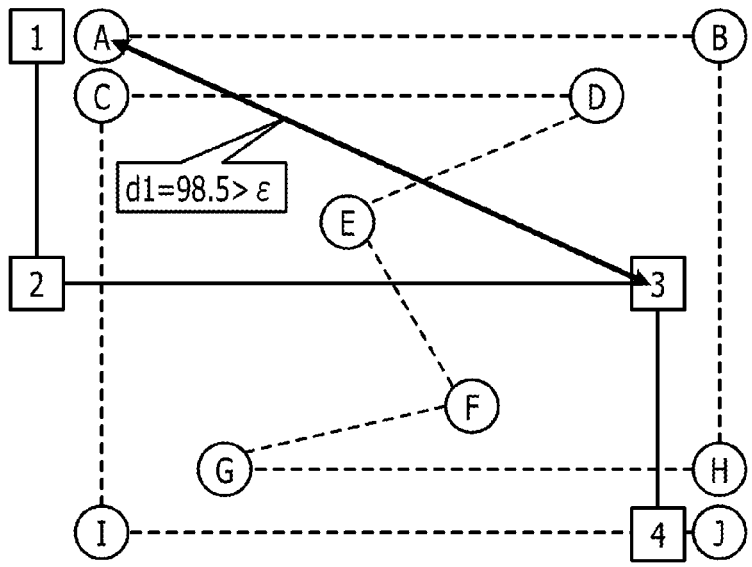
FIG. 19 illustrates an example of an initial distance calculation process.

FIGS. 17, 18, and 19 illustrate an example of an initial distance calculation process. FIG. 17 illustrates details of the initial distance calculation process performed at the current setting. In FIG. 17, "target processing data" corresponds to (d, -i, V, V', S, path) set in operation S13.

In operation S31 in FIG. 16, the calculation unit 12 sets the larger one of i and 1 to a variable j representing the number of a line segment being retrieved as a line segment corresponding to a node V'. For example, since i=0 is set, j=1 is set. The calculation unit 12 sets S+[V'] to S' representing the arrangement of nodes corresponding to a jth line segment. For example, S'=[A] is set. The calculation unit 12 sets path+[V'] to path' representing a path to which a retrieved node has been newly added. For example, path'=[A] is set. The calculation unit 12 sets 0 as an initial value of a distance d1 between an observation point j and a link V_V'. Values set in operation S31 are values of "j", "S'", "path'", and "d1" in <d'> in FIG. 17.

In operation S32, the calculation unit 12 calculates a maximum value d1' of the distance between each of observation points j' and j, for each j' where i+1≤j'≤j is established, and a link V_V'. The calculation of the distance is performed in the procedure for calculating the Frechet distance $\epsilon_{X,Y}$ using the matrix of <d1'> in FIG. 17. For example, since j'=1 is set, the distance of 10.0 between an observation point 1 and a link A_A (=a node A) is d1'. The calculation unit 12 sets the larger one of d1' and d1 as d1. Since d1=0 is set in operation S31, d1=10.0 is set (see the upper part of FIG. 17). Since j'≥i+1 is set, the distance calculation may be performed only for a set of observation points included in a newly searched line segment. d1 calculated in operation S32 corresponds to the item of "d1" in <d'> in FIG. 17.

In operation S33, the calculation unit 12 determines whether d1 calculated in operation S32 is equal to or less than ε. When d1 is equal to or less than ε, the node being retrieved is determined to be a node corresponding to the jth line segment and the process proceeds to operation S34. When d1 is greater than ε, the node being retrieved is determined not to be a node corresponding to the jth line segment and the process returns to the route information process illustrated in FIG. 13. For example, since d1=10.0≤ε=50 is set, the determination is YES and the process proceeds to operation S34.

In operation S34, the calculation unit 12 calculates d2 that is the maximum value of a distance d2' between a node V''' and a node V' and the jth line segment (line segment j_j+1) for each node V''' included in S' (see the upper part of FIG. 17). The calculation of the distance is performed in the procedure for calculating the Frechet distance $\epsilon_{X,Y}$ using the matrix of <d2'> in FIG. 17. For example, since node V'''=node V'=node A is set, the distance of 10.0 between a line segment 1_2 and the link A_A (=the node A) is d2. The calculation unit 12 sets the largest one of d, d1, and d2 as d'. For example, d'=10.0 is set. d2 and d' calculated in operation S34 correspond to the items of "d2" and "d'", respectively, in <d'> in FIG. 17.

In operation S35, the calculation unit 12 determines whether d' calculated in operation S34 is equal to or less than ε. When d' is equal to or less than ε, the node being retrieved is determined to be a candidate to be newly added to a path and the process proceeds to operation S36. For example, since d'=10.0≤ε=50 is set, the determination is YES and the process proceeds to operation S36.

In operation S36, it is determined whether the combination of V' and j is included in a list L. The list L is a list that records a Frechet distance d after the retrieval for the node V has been completed to ith line segments, and includes the items of "V", "i", and "d" as illustrated in <list L> in FIG. 17. In a case where the combination of V and i that matches the combination of V' and j is included in the list L, the process proceeds to operation S37 and in a case where the combination of V and i is not included in the list L, the process proceeds to operation S38. Since the list L is empty at the initial stage, the determination is NO and the process proceeds to operation S38.

In operation S38, the calculation unit 12 records (V', j, d') in the items of "V", "i", and "d" in the list L, respectively. The calculation unit 12 records information about a newly retrieved node in a list Q that indicates information about a retrieved node. For example, the list Q includes the items of "d", "-i", "V", "S", and "path" as illustrated in <list Q> in FIG. 17. The calculation unit 12 records (d', -j, V', S', path') in corresponding items of the list Q.

In operation S39, the extraction unit 13 increments j by one and sets [V'] for S'. By setting [V'] for S', the calculation of the distance is performed only upon the node V' in operation S34.

In operation S40, it is determined whether j is equal to or less than p representing the number of observation points in the trajectory. When j is equal to or less than p, the process returns to operation S32. When j is greater than p, the process returns to the route information process in FIG. 13. For example, since j=1≤p=4 is set, the determination is YES and the process returns to operation S32.

FIG. 18 illustrates the process from operation S32 performed at the current setting. At this stage, <target processing data> is the same as that in FIG. 17. In <d'>, 0 is set to "d", 10.0 is set to "d1", 2 is set to "j", [A] is set to "S'", and [A] is set to "path'". By performing the same process as above, d1=41.2 is obtained in operation S32 (see the upper part of FIG. 18), the determination is YES in operation S33, and d2=40.0 (see the upper part of FIG. 18) and d'=41.2 are obtained in operation S34. The determination is YES in operation S35, the determination is NO in operation S36, and data is added to the list L and the list Q as illustrated in FIG. 18 in operation S38. The process returns to operation S32 again via operations S39 and S40.

FIG. 19 illustrates the process from operation S32 performed at the current setting. At this stage, <target processing data> is the same as that in FIG. 17. In <d'>, 0 is set to "d", 41.2 is set to "d1", 3 is set to "j", [A] is set to "S'", and [A] is set to "path'". By performing the same process as above, d1=98.5 is obtained in operation S32 (see the upper part of FIG. 19). Therefore, in operation S33, the determination is NO and the process returns to the route information process in FIG. 13.

In operation S15 in FIG. 13, whether the extraction unit 13 has selected all nodes included in the node set {V} extracted in operation S11 is determined. When there is an unselected node, the process returns to operation S12 and when all nodes have already been selected, the process proceeds to operation S16. For example, since the node C is not selected, the process returns to operation S12. The extraction unit 13 selects the node C, sets (0, 0, C, C, [ ], [ ]) to the target processing data (d, -i, V, V', S, path) in operation S13, and performs the above-described initial distance calculation process.

When the initial distance calculation process for the node C has been completed, the determination is YES in operation S15 and the process proceeds to operation S16. FIG. 20 illustrates an example of a list Q and an example of a list L after an initial distance calculation process. FIG. 21 illustrates an example of extraction of target processing data in a first loop.

In operation S16, the extraction unit 13 moves data in the list Q to a list P to empty the list Q as illustrated in FIG. 21. In operation S17, the extraction unit 13 determines whether the list P is empty, and when the list P is empty, the process proceeds to operation S25, when the list P is not empty, the process proceeds to operation S18. For example, since the list P is not empty, the process proceeds to operation S18.

In operation S18, the extraction unit 13 sorts the list P in ascending order for the items of "d" and "−i". The extraction unit 13 extracts the top data (d, −i, V, S, path) of the list P as target processing data. Since the list P has been sorted in ascending order for the items of "d" and "−i", the top data is data representing the minimum value of the Frechet distance, for example, the highest similarity degree between a retrieved line segment and a path. For example, (d, −i, V, S, path)=(10.0, −1, A, [A], [A]) is extracted. This data indicates that the first line segment (the line segment 1_2) has already been searched, a retrieved node is A, a node corresponding to the first line segment is [A], a retrieved path is [A], and the Frechet distance between the path and the first line segment in a trajectory is 10.0.

In operation S19, the extraction unit 13 determines whether "i" in the target processing data extracted in operation S18 is the same as p. In the case of i=p, the process proceeds to operation S24. In the case of i≠p, the process proceeds to operation S20. For example, since i=1≠p=4 is set, the determination is NO and the process proceeds to operation S20.

In operation S20, the extraction unit 13 extracts all nodes adjacent to the node V in the item of "V" in the target processing data and sets a node set {V'} of the extracted nodes. For example, since the node V is the node A, {V'}={B, C} is set.

In operation S21, the extraction unit 13 selects one node V' from the node set {V'}. For example, a node B may be selected.

In operation S22, the extraction unit 13 performs the distance calculation process illustrated in FIG. 16 as the second-stage distance calculation process.

Figure 22:
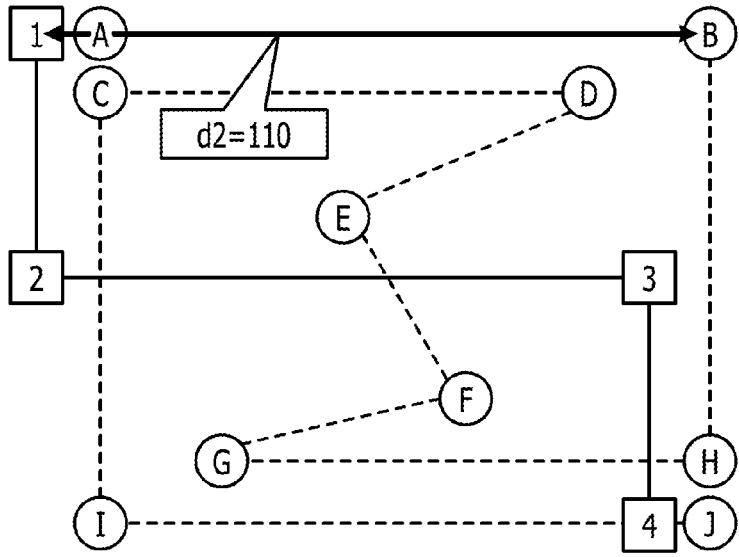
FIG. 22 illustrates an example of a second-stage distance calculation process.
Figure 23:
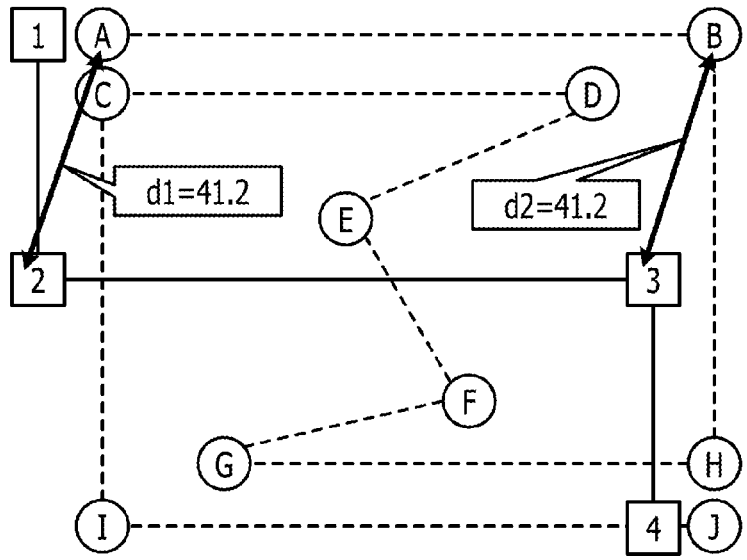
FIG. 23 illustrates an example of a second-stage distance calculation process.
Figure 24:
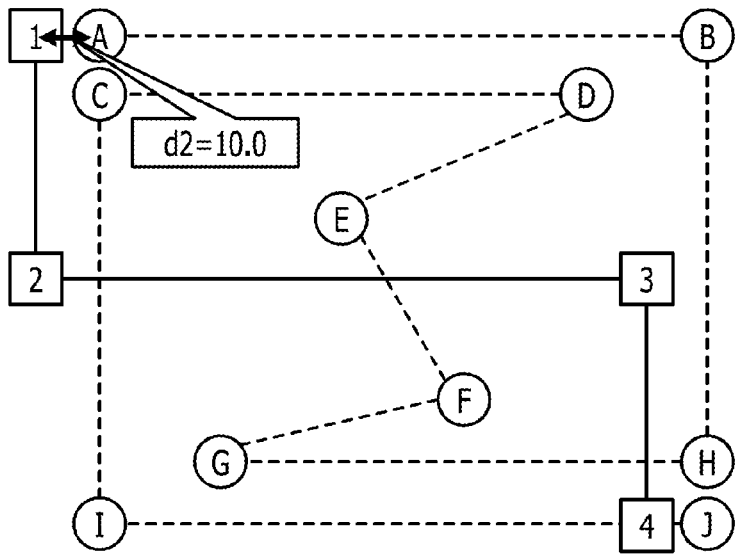
FIG. 24 illustrates an example of a second-stage distance calculation process.

FIGS. 22, 23, and 24 illustrate an example of a second-stage distance calculation process. FIG. 22 illustrates the second-stage distance calculation process performed at the current setting. At this stage, in <target processing data>, the target processing data extracted in operation S18 and the node V' selected in operation S21 are set. By performing the same process as above, in <d'>, 1 is set to "j'", [AB] is set to "S'", [AB] is set to "path'", and 0 is set to "d1'" in operation S31. In operation S32, because there is no j' satisfying i+1≤j'≤j, d1=0 is obtained (see <d1'> in FIG. 22). The determination is YES in operation S33; in operation S34, d2=110 (see the upper part of FIG. 22) and d'=110 are obtained; in operation S35, the determination is NO; and the process returns to operation S32 again via operations S39 and S40.

FIG. 23 illustrates the process from operation S32 performed at the current setting. At this stage, <target processing data> is the same as that in FIG. 22. In <d'>, 10.0 is set to "d", 0 is set to "d1", 2 is set to "j", [B] is set to "S", and [AB] is set to "path'". By performing the same process as above, d1=41.2 is obtained (see the upper part of FIG. 23) in operation S32, the determination is YES in operation S33, and d2=41.2 (see the upper part of FIG. 23) and d'=41.2 are obtained in operation S34. In operation S35, the determination is YES; in operation S36, the determination is NO; and in operation S38, each item is added in the list Q and the list L as illustrated in FIG. 23. The process returns to operation S32 again via operations S39 and S40.

In the case of j=3, the process from operation S32 is also performed. In operation S38, (V, i, d)=(B, 3, 41.2) is added to the list L and (d, −i, V, S, path)=(41.2, −3, B, [B], [AB]) is added to the list Q. The process returns to operation S32 again via operations S39 and S40.

In the case of j=4, d3=80 is obtained in operation S32, the determination is NO in operation S33, and the process returns to the route information process illustrated in FIG. 13. The determination is NO in operation S23, and the process returns to operation S21. In operation S21, the extraction unit 13 selects a node C as the node V', and in operation S22, the second-stage distance calculation process is performed.

FIG. 24 illustrates the second-stage distance calculation process at the current setting. At this stage, in <target processing data>, the target processing data extracted in operation S18, (d, −i, V, S, path)=(10.0, −1, A, [A], [A]) is set and the node C selected in operation S21 is set as the node V'. By performing the same process as above, in operation S31, 1 is set to "j'", [AC] is set to "S'", [AC] is set to "path'", and 0 is set to "d1'" in <d'>. In operation S32, there is no j' satisfying i+1≤j'≤j, d1=0 is obtained (see <d1'> in FIG. 24). The determination is YES in operation S33; in operation S34, d2=10.0 (see the upper part of FIG. 24) and d'=10.0 are obtained; in operation S35, the determination is YES; and the process proceeds to operation S36.

Since (V', j)=(C, 1) is included in the list L, the determination is YES in operation S36 and the process proceeds to operation S37. In operation S37, the calculation unit 12 determines whether d' calculated in operation S34 is less than "d" corresponding to (V, i) that is the same as the combination of (V', j) included in the list L. For example, since d'<d in the list L, the process proceeds to operation S38. In operation S38, as illustrated in FIG. 24, the calculation unit 12 updates d corresponding to (V, i) that is the same as (V', j) with d' in the list L. The calculation unit 12 deletes (V, i) that is the same as (V', j) in the list P. The calculation unit 12 adds (d', −j, V', S', path') to the list Q. The process returns to operation S32 again via operations S39 and S40.

In the case of j=2, the process from operation S32 is also performed. In operation S34, d'=31.6 is obtained; in operation S35, the determination is YES; in operation S36, the determination is YES; and the process proceeds to operation S37. For example, (V', j)=(C, 2) is set and d corresponding to (C, 2) is 31.6 in the list L. Accordingly, since d'<d in the list L is not satisfied, operation S38 is skipped and the process proceeds to operation S39. The process returns to operation S32 again via operations S39 and S40.

In the case of j=3, d1=94.9 is obtained in operation S32 and the determination is NO in operation S33. The process returns to the route information process illustrated in FIG. 13. In operation S23, the determination is YES and the process returns to operation S16.

FIGS. 25 to 40 illustrate an example of a list. FIG. 25 illustrates the list Q and the list L after the first loop (an nth loop is hereinafter referred to as "loop n") in the second-stage distance calculation process. The process from operation S16 to operation S23 may be one loop in the second-stage distance calculation process.

In FIG. 26, target processing data is extracted in a loop 2. In the loop 2 in the second-stage distance calculation process, the extraction unit 13 moves data in the list Q to the list P and empties the list Q in the process from operation S16 to operation S18 as illustrated in FIG. 26. The extraction unit 13 sorts the list P in "d" and "−i" and extracts the top data, (d, −i, V, S, path)=(10.0, −1, C, [AC], [AC]), as target processing data.

By performing the same process as above in the second-stage distance calculation process (the loop 2), the list Q and the list L after the second-stage distance calculation process (the loop 2), illustrated in FIG. 27, are obtained. FIG. 28 illustrates the extraction of target processing data in the second-stage distance calculation process (a loop 3) and FIG. 29 illustrates the list Q and the list L obtained after the second-stage distance calculation process (the loop 3). Similarly, FIG. 30 illustrates the extraction of target processing data in the second-stage distance calculation process (a loop 4). FIG. 31 illustrates the extraction of target processing data in the second-stage distance calculation process (a loop 5) and FIG. 32 illustrates the list Q and the list L obtained after the second-stage distance calculation process (the loop 5). FIG. 33 illustrates the extraction of target processing data in the second-stage distance calculation process (a loop 6) and FIG. 34 illustrates the list Q and the list L obtained after the second-stage distance calculation process (the loop 6). FIG. 35 illustrates the extraction of target processing data in the second-stage distance calculation process (a loop 7) and FIG. 36 illustrates the list Q and the list L obtained after the second-stage distance calculation process (the loop 7). FIG. 37 illustrates the extraction of target processing data in the second-stage distance calculation process (a loop 8). FIG. 38 illustrates the extraction of target processing data in the second-stage distance calculation process (a loop 9) and FIG. 39 illustrates the list Q and the list L after the second-stage distance calculation process (the loop 9). After the loop 4 and the loop 8, the list Q and the list L may not be changed from those after the previous loop.

As illustrated in FIG. 40, in target processing data extracted in the second-stage distance calculation process (loop 10), i=p (=4) is set as illustrated in FIG. 40. Therefore, the determination is YES in operation S19 and the process proceeds to operation S24.

In operation S24, the extraction unit 13 extracts "path" in the extracted target processing data, for example, [ACIJ], as a normalized trajectory. For example, the trajectory (the observation points 1, 2, 3, and 4) illustrated in FIG. 14 indicates matching with a path of the nodes A→C→I→J on the route graph. FIG. 41 illustrates an example of normalized trajectory data. The extraction unit 13 outputs the extracted path as normalized trajectory data as illustrated in, for example, FIG. 41. The route information process ends.

In a case where it is determined in operation S17 that the list P is empty before the determination is YES in operation S19, a path corresponding to the trajectory may not exist in the route graph. The process proceeds to operation S25, and the extraction unit 13 outputs an error to end the route information process.

In a route information processing apparatus, the Frechet distance that is the maximum value of the distance between each set of two nodes associated with a line segment between observation points and the line segment is calculated as the similarity degree between a trajectory and a path on the route graph. Accordingly, the similarity degree between the trajectory and the path on the route graph may be efficiently calculated. Since the Frechet distance where the order of nodes is taken into account is calculated as the distance between a node and a line segment, a similarity degree accurately reflecting a portion where the direction of movement changes, for example, a U-turn or a loop included in a trajectory, may be calculated.

In a case where a path that matches a trajectory is updated while searching for a node adjacent to an existing node, only for newly retrieved nodes, the distance between each node of a set of nodes and a line segment may be calculated and a result of the calculation may be compared with the Frechet distance calculated before the updating. The cost of calculation for the matching between the trajectory and the path on a route graph may be therefore reduced.

The route information processing program 50 may be stored (installed) in the storage device 43 in advance. The route information processing program 50 may be recorded in a recording medium such as a CD-ROM, DVD-ROM, USB memory, or the like and the recording medium recording the route information processing program 50 may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A route information processing apparatus comprising:
a processor configured to execute a program; and
a memory configured to store the program,
wherein, based on the program, the processor performs operations to:
calculate maximum values corresponding to a Frechet distance between one line segment of one or more line segments between observation points, which are generated chronologically by that a movable body moves and included in a trajectory, and each of sets of two nodes, which are included in fixed nodes, corresponding to the one line segment based on a first order of the fixed nodes and a second order of observation points generated chronologically, the fixed nodes being included in a route graph including linked paths which links nodes of the fixed nodes; and
acquire a path corresponding to the trajectory having a smallest value among the maximum values of the one or more line segments.

2. The route information processing apparatus according to claim 1, wherein the one or more line segments are set in the second order of observation times at the observation points.

3. The route information processing apparatus according to claim 1, wherein the processor, when the acquiring is performed while updating the path, calculates the maximum values based on new maximum values for a set of two newly retrieved nodes and previously-calculated maximum values.

4. The route information processing apparatus according to claim 1, wherein the processor obtains a first position corresponding to a first distance of a shortest distance from a first node of one of the sets to the one line segment and a second position corresponding to a second distance of a shortest distance from a second node of the one of the sets to the one line segment.

5. The route information processing apparatus according to claim 4, wherein the processor calculates the maximum value based on a relationship among the first position, the second position, and positions of the observation points corresponding to the one or more line segment.

6. The route information processing apparatus according to claim 5, wherein, based on the relationship, the processor sets, as the maximum value, a longer one of the first distance and the second distance, or, sets, as the maximum value, a shortest one of the first distance, the second distance, and a third distance from an intersection of a perpendicular bisector of a line segment between the first node and the second node to the one line segment.

7. The route information processing apparatus according to claim 1, wherein the two nodes corresponding to the one line segment is located within a certain distance of the one line segment.

8. A route information processing method, comprising:
calculating, by a computer, maximum values corresponding to a Frechet distance between one of one or more line segments between observation points, which are generated chronologically by that a sensor observes a position of a movable body periodically and included in a trajectory, and each of sets of two nodes, which are included in fixed nodes, corresponding to the one line segment based on a first order of the fixed nodes and a second order of observation points generated chronologically, the fixed nodes and are included in a route graph including linked paths which link nodes of the fixed nodes; and
acquiring a path corresponding to the trajectory having a smallest value among the maximum values for each of the one or more line segments.

9. The route information processing method according to claim 8, wherein the one or more line segments are set in the second order of observation times at the observation points.

10. The route information processing method according to claim 8 wherein, when the acquiring is performed while updating the path, the maximum values are calculated based on new maximum values for a set of two newly retrieved nodes and previously-calculated maximum values.

11. The route information processing method according to claim 8, further comprising, obtaining a first position corresponding to a first distance of a shortest distance from a first node of one of the sets to the one line segment and a second position corresponding to a second distance of a shortest distance from a second node of the one of the sets to the one line segment.

12. The route information processing method according to claim 11, wherein the maximum values are calculated based on a relationship among the first position, the second position, and positions of the observation points corresponding to the one or more line segment.

13. The route information processing apparatus according to claim 12, wherein, based on the relationship, a longer one of the first distance and the second distance is set as the maximum value, or, a shortest one of the first distance, the second distance, and a third distance from an intersection of a perpendicular bisector of a line segment between the first node and the second node to the one line segment is set as the maximum.

14. The route information processing apparatus according to claim 8, wherein the two nodes corresponding to the one line segment is located within a certain distance of the one line segment.

* * * * *